United States Patent Office 2,939,199
Patented June 7, 1960

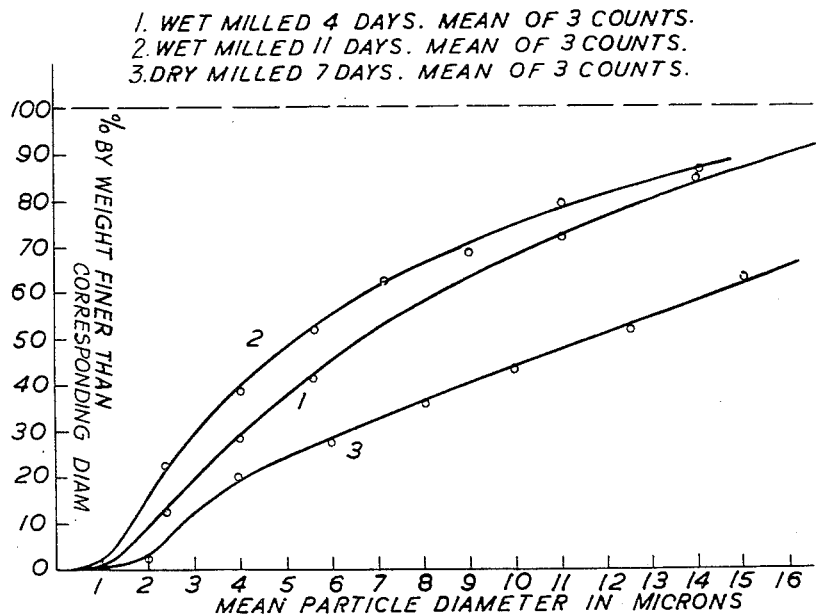
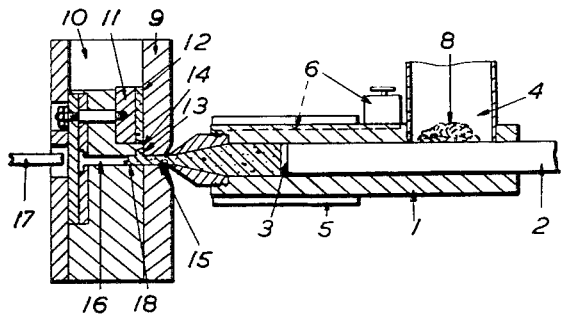

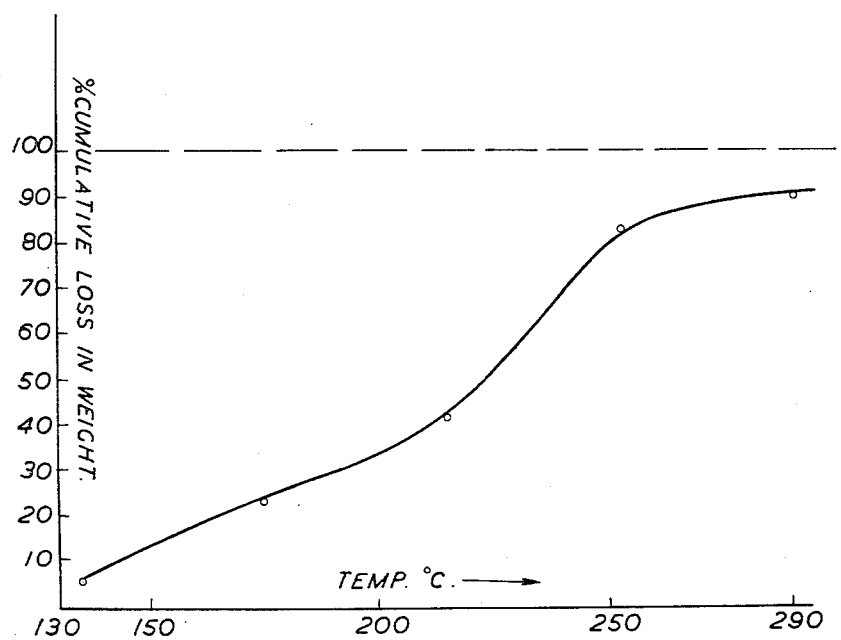
FIG.3. DISTILLATION RATE FOR MOULDING FORMULATION.2

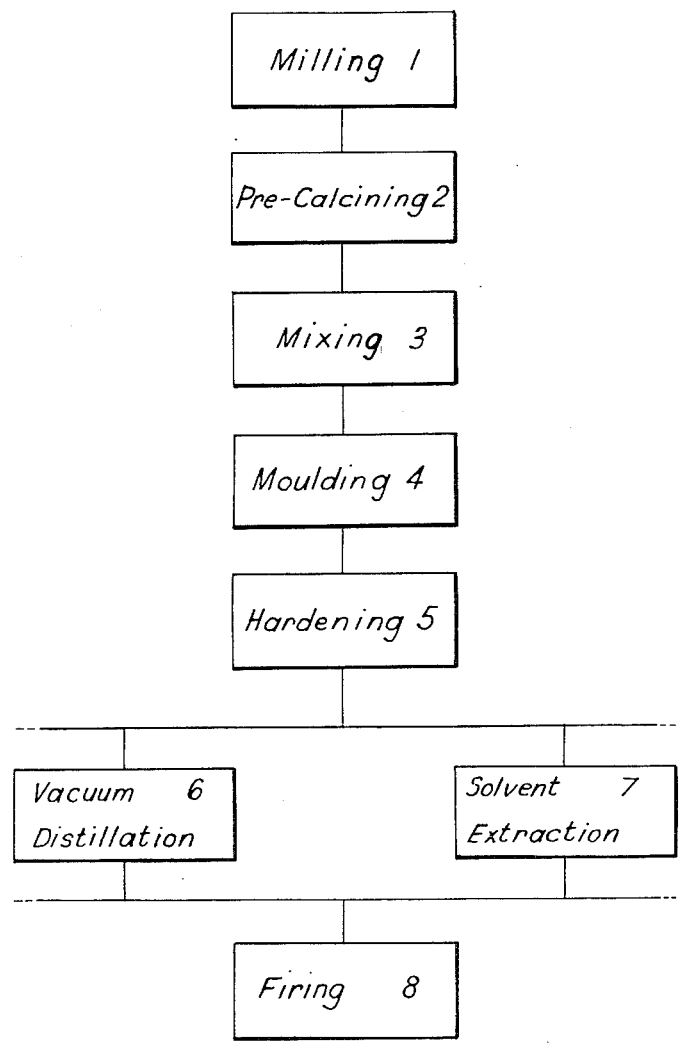

2,939,199

FORMATION OF CERAMIC MOULDINGS

Maurice Andrew Strivens, London, England, assignor to International Standard Electric Corporation, New York, N.Y., a corporation of Delaware Filed Aug. 7, 1953, Ser. No. 372,944

Claims priority, application Great Britain Aug. 11, 1952

19 Claims. (Cl. 25—156)

This invention relates to the formation of articles from suitable materials, for instance, ceramic powders, metal carbides, cermets, or mixtures of these including magnet materials, and its object is to provide a process and suitable formulations of materials for the economical production of articles in large numbers to controlled dimensions.

One feature of the invention comprises a moulding mixture comprising a sinterable material and a vehicle comprising a thermosetting moulding material and a plasticiser so chosen that the thermosetting material can be substantially hardened without driving off any significant part of the plasticiser.

The invention comprises a process for the production of articles from sinterable material which process comprises the steps of mixing the sinterable material with a vehicle comprising at least one hardenable component, forming the shape required by the application of heat and pressure, stabilising the shape by hardening the hardenable component, removing the greater part of the vehicle and finally firing the shape.

The invention will be described in relation to various processes and formulations with reference to the accompanying drawings in which:

Fig. 1 shows graphs of particle size v. weight distribution for milled aluminas;

Fig. 2 is a schematic diagram illustrating the injection moulding process;

Fig. 3 is a graph of the distillation-rate for moulding formulation or vehicle No. 2; while Fig. 4 is a simplified flow diagram illustrating the processes described.

The trend towards high quality of ceramics in many fields relies more and more on the use of relatively pure, and hence non-plastic oxide ceramics, so that special methods of manufacture must be employed for such materials. The problem is of course similar with refractory metals.

However, the process is not necessarily limited in its application to non-plastics.

Ease and accuracy of moulding are determined largely by the flow properties of the moulding material: these can be improved by the addition to the sinterable material of suitable moulding vehicle. However, the difficulty then arises of later removing the vehicle without uncontrolled change of shape or dimension. By means of the types of mixtures and processes to be described, moulding mixtures capable of highly accurate moulding and accurately predictable dimensional changes during manufacture are made available.

The basic technique is to provide for moulding under optimum flow conditions throughout, fixing of the moulded shape without loss of vehicle, removal of vehicle, and final firing, and the vehicle constituents are chosen so as to make this technique possible.

Thermosetting material (including so-called cold-setting material) is included in the vehicle to give the fixing of the shape; plasticiser is included to give easy flow and, together with any other vehicle constituents, is so chosen that it is not removed during the hardening operation; and a temperature gradient is provided between the removal temperatures of the various vehicle constituents so that they are gradually extracted during the removal operation without risk of collapse of the article.

Hardening without loss of vehicle is dependent on low vapour pressure of the other vehicle constituents, which in turn necessitates a suitable removal process. Such processes are for instance, vacuum distillation, and solvent extraction.

The process is applicable to the production of articles from any ceramic body, though of course the formulation and the process parameters will vary with the body. In particular, it is suitable for semi-conductor, ferromagnetic, ferroelectric, and high-permittivity ceramics.

The main stages in the process are illustrated in the "flow-sheet" shown in Fig. 4 and may be briefly described as follows:

(N.B.—The numbered stages correspond to the number "boxes" of the flow-sheet.)

(1) *Milling.*—Preparation of the ceramic or other sinterable material in suitably sub-divided form.

(2) *Pre-calcining.*—This does not apply to all sinterable materials, but only to certain mixtures in which a certain number of reactions are preferably carried out in the solid state at moderate temperatures (around 1000° C.) before moulding.

(3) *Mixing.*—The process of mixing the prepared base material with the moulding vehicle.

(4) *Moulding.*—Moulding the mixture to the required shape by any one of well-known techniques, e.g. extrusion, injection, pressing and so on.

(5) *Hardening.*—This is a general term for the process by which the "green" shape from the moulding process is rendered permanent, and for a thermosetting component of the vehicle (as defined) comprises a curing process (polymerisation, cross-linking or the like).

At this point, the main process branches into a number of possible different processes for removing the moulding vehicle, two of which are to be described:

(6) *Vacuum distillation,* in which the vehicle is removed at moderate temperature under conditions of low pressure; and (7) *Solvent extraction,* in which the vehicle is removed by well-known solvents which may thereafter be extracted for further use.

(8) *Firing.*—This is the final stage, in which the residual carbonaceous matter, or the bulk of it, is removed by oxidation and the base material (ceramic or the like) is agglomerated by sintering, or "densified."

The main example of the production of sintered bodies by the process of the present invention will be that of sintered alumina ceramic, with reference also to a number of other ceramic bodies.

THE PROCESS FOR SINTERED ALUMINA

*Preparation of the alumina*

The raw material is fused alumina passing 200-mesh per inch, which is wet-ground in a rubber ball-mill of known type, using sintered alumina balls as the grinding medium. This is to avoid the contamination by iron which occurs when a conventional steel ball-mill is used, or contamination by siliceous material when a porcelain or flint lined mill is used.

For a mill of capacity ⅓ cubic foot the mill charge is as follows:

Sintered alumina balls (50 g. each approx.) ___kg___ 4
Sintered alumina balls (20 g. each approx.) ___kg___ 3
Fused alumina, 200-mesh _____kg___ 3
Distilled water _____litres___ 1.6

The milling time is 96 hours at 58–60 r.p.m.

The milled product is in the form of a thin cream which is emptied from the mill into basins and dried at about 150° C. overnight, or alternatively, is filtered and dried. The dried cake is crushed between rubber rollers to facilitate mixing.

The particle size distribution for this material is shown in Fig. 1 and is suitable for sintering at 1780°–1800° C. to give a product of density about 3.5 g./cc.

*Preparation of the moulding compound*

The following formulations in which the first term is a sinterable material, which formulations can be moulded and taken through to the final firing stage without distortion or spoilage of the moulded part, are given by way of example:

|  | Percent by wt. |
|---|---|
| (1) Milled alumina | 85–86 |
| Epok Resin C46 | 5–7 |
| Araldite Resin Type I | 3.3–4 |
| Wax 365 | 3–4 |
| Butyl stearate | 1.3–2.0 |

(2) As above but with the Wax 365 and butyl stearate replaced by an equivalent weight of glyceryl monostearate.

(3) As in (2) but with the Araldite resin replaced by Bakelite Resin R. 5363.

|  | Percent by wt. |
|---|---|
| (4) Milled alumina | 85–86 |
| Epikote Resin Type 1004 | 5–7 |
| Bakelite Resin R. 5468 | 2 |
| Epok Resin C46 | 2 |
| Wax 365 | 3 |
| Butyl stearate | 1.5–2.0 |
| (5) Milled alumina | 85–86 |
| Epikote Resin Type 1001 | 6 |
| Bakelite Resin R. 5468 | 1.5 |
| Epok Resin C46 | 2.9 |
| Wax 365 | 4.6 |

The Epok resin is a coumarone-indene type of thermoplastic resin manufactured by British Resin Products Ltd. This Epok resin may be used as a modification for the thermosetting or hardenable materials.

The Araldite resin is a thermosetting resin based on a condensation product of epi-chlorhydrin and diphenylolpropane, and is manufactured by Ciba Ltd. This thermosetting resin is a hardenable component of the moulding vehicle.

Wax 365 is a synthetic substitute for beeswax and is manufactured by Claud Campbell and Co. Ltd., although any substantially pure beeswax may be used, or any wax of similar composition to beeswax. This material represents the plasticiser or one of the plasticisers in the moulding vehicle.

Butyl stearate and glyceryl monostearate are obtained from any manufacturing chemists. These materials represent plasticisers forming part of the moulding vehicle.

The Epikote resin is similar to the Araldite resin, being also a condensation product of epi-chlorhydrin and diphenylolpropane but has different compatibility characteristics and curing properties. This material is also a hardenable material which forms a portion of the moulding vehicle in Example 4 above.

The components of the mixture are mixed preferably, though not necessarily, in a duplex mixer, the mixing chamber and the blades of which are chromeplated and polished.

Mixing is carried out at 120°–130° C. and requires 15 to 20 minutes to form a satisfactory dough. The dough may be granulated by cooling with the machine running and this takes about 20 minutes.

The above formulations are instanced merely by way of example for one ceramic powder and a linear shrinkage factor of about 13%. However it may be desired to work to a higher or lower shrinkage factor and to work with other particle size distribution and kinds of sinterable material, or to finish up with a dense or a porous fired body. In these cases the same class of organic materials as described above may be used, due consideration being given to the total volume percentage and relative volume percentages required.

The volume ratio of sinterable material to vehicle may be as low as 45/55, or even lower in special cases, and still yield a coherent body, and the ratio may be as high as 70/30 for obtaining dense bodies and low shrinkage factors, or even higher consistent with obtaining suitable flow properties.

Of the vehicle, the preferred volume percentage of hardenable component is generally about 25–35%. This volume percentage may be increased to 50% or more, if desired, but the higher the value the more difficult it becomes to obtain satisfactory flow characteristics, though the dimensional stability improves.

This volume percentage may also be lower than 30%, but it is inadvisable to reduce this below 10% as dimensional stability will be very much reduced.

The volume ratio of modifier to hardenable component may be used to control the fluidity of the formulation, and this factor is especially valuable when the plasticiser is also compatible with the hardenable component and the modifier.

Low ratios are used when using high volume percentages of sinterable material or when the particles exert an undue resistance to flow, to give maximum flowability; the modifier may even be omitted altogether, thus relying on the plasticiser to control both hardening and flowability.

High ratios are used when using low volume percentages of sinterable material to increase stiffness and thus prevent flashing in moulding and to increase coherence. In general it is not necessary to increase this ratio beyond about 3 for a volume percentage of about 10% of the hardenable component.

*Injection moulding*

The moulding process may be described with reference to Fig. 2, which shows a section through part of a suitable apparatus at a particular stage of the moulding cycle.

The heating cylinder 1 is heated to about 140° C. by means of a band heater 5 and thermostatically controlled by means of an element 6. The injection plunger 2 with a false tip 3 is shown in the forward position, the mould cavity 12 having just been filled. The plunger is maintained in this position under pressure for a definite period known as the plunger forward time. This period will depend on the size and shape of the mould cavity, but is generally of short duration, about one second. At the end of the plunger forward time, the cylinder and plunger retract to the normal position, with the plunger tip at the rear of the feed channel 4. This allows the next charge of material 8 to fall in front of the plunger. The rate of feed is so adjusted that the cylinder always contains at least 3 to 4 shots of material.

The front half of the mould, the sprue-plate 9, is bolted to a fixed platen of the press, while the rear-half, the bolster 10, is bolted to a moving platen. From the beginning of the plunger forward period, the cooling period for the moulded part commences. This also depends on the size and shape of the cavity, and may vary from about 2 seconds up to 15 seconds. At the end of the cooling period, the mould is opened. As the mould opens the Z-pin 16 pulls the material from the sprue channel 15, thus clearing the latter for the next cycle. As the bolster approaches its rearward position, the ejector pin 17 moves the ejector 11 and Z-pin forward, ejecting the moulded part together with the runner 13 and gate 14. These are removed by hand and the mould is closed for the next cycle. The space immediately in front of the Z-pin serves as a well to collect the first material, which may be slightly chilled coming from the tip of the nozzle, thus eliminating the possibility of blocking the gate.

The moulded parts have a high green strength and may be handled and stacked, ready for the curing stage, without difficulty.

*Curing*

The moulded parts are suitably supported in trays or boxes and heated to cure the thermosetting constituent of the moulding compound. The parts may be placed in an oven at substantially the moulding temperature and the temperature raised at about 15° C. per hour to a peak curing temperature and held there for a period sufficient to cure its thermosetting constituent. The peak temperature should not exceed about 220° C.

The method of supporting the parts during the curing stage depends on the shape. The flow properties of the material when hot and at the beginning of the curing stage are such that the material will not flow unless subjected to some force. If the moulded part is of sufficiently thick section and has a large flat surface for support, it may be cured by supporting it on this surface, without distorting under its own weight.

In general it is preferred to embed the parts in granular fused aulmina. This ensures that all surfaces are adequately supported whatever the shape. There is practically no shrinkage during the curing stage (about 0.1%) so that parts having holes or recesses are in no danger of being cracked. There is a small loss of volatile matter during curing and embedding ensures a uniform loss per unit area over all surfaces.

*Low pressure distillation or solvent extraction*

The greater part of the moulding vehicle is removed from the moulded parts by low pressure distillation or by solvent extraction. The parts may be satisfactorily fired when only 50% by weight of the moulding vehicle has been removed. It is preferred however to remove about 90–95% and recover the maximum material for re-use. The remaining fraction consists of a carbonaceous residue which is burnt off in the early part of the final firing.

For low pressure distillation, the parts may be stacked, as for the curing stage, or embedded in granular alumina, as again there is practically no shrinkage. They are placed in a vacuum chamber provided with internal heaters and thermocouples. The chamber is pumped down to a pressure of about 2 to 5 mm. Hg and the temperature increased gradually according to a predetermined schedule. It is not possible to give a general rule for the temperature-time schedule, since the temperature distribution through the charge must be known first, and this will depend on the design of the heating arrangements and the size of the charge, and also on the shape and section of the moulded parts. The total distillation time has been as short as 8 hours for small parts and as long as 20 hours for larger parts. The critical range of temperature is between 200° and 250° C., since in this range both the Araldite type and the Bakelite type of resin tend to foam and the overall rate of distillation is high. A temperature rise of about 10° C. per hour is considered to be safe in this range, provided excessive temperature gradients are not allowed to develop in the moulding.

The distillation rate for moulding formulation vehicle 2 was determined and is shown in Fig. 3. The points on the curve represent the cumulative loss in weight after heating for 1 hour at the specified temperatures and at a pressure between 2 and 4 mm. Hg.

The solvent extraction process is one of possible alternatives to vacuum distillation, and has certain advantages over that process.

In the extraction process, the formed parts are subjected, with or without prior heat treatment, to extraction by means of a suitable solvent or solvent vapour to remove the major part of the moulding medium, and finally fired by ordinary ceramic or powder metallurgical methods.

At least two components must be comprised in the moulding vehicle, at least one of them being insoluble or only slightly soluble in the extraction solvent at the time of extraction, and the remainder being soluble.

Organic moulding media as described in the above formulations may be used.

Suitable solvents are acetone, amyl acetate, methyl ethyl ketone, carbon tetrachloride, trichloroethylene.

The extraction may be carried out by placing the parts in a cage and immersing them in the boiling solvent, or running hot solvent or solvent vapour over the parts stacked in a suitable container. After extraction the parts may be simply air dried or oven dried for a short period (15 minutes) to remove residual solvent, before firing.

Extraction may also be carried out by placing them on a suitable conveyor and passing the conveyor through a zone of solvent vapour or under a drip feed of hot solvent and thence through a drying zone.

Although the theory of the process is not known with exactitude, it is believed that the insoluble part of the moulding vehicle forms an independent matrix, which by proper selection and proportioning of the components of the moulding vehicle, is strong enough to give the parts adequate coherence and mechanical strength to prevent deformation cracks and blistering in processing etc. or breakage due to handling. The volume percentage of this matrix is small enough for the matrix to be burned off without causing deformation etc.

The advantages of the process of solvent extraction may be summarised thus:

(a) The removal of the moulding vehicle is faster and requires less expensive and more easily maintained plant.

(b) The major part of the moulding vehicle is recovered in the same form as that in which it enters the moulding compound.

(c) Defects in treated parts are more easily detected, facilitating rejections before they enter the firing stage.

(d) Where machining of parts before firing is required, there is less tendency to clogging of the tools using solvent extracted parts than with parts which have only been heat-treated to harden them.

(e) Relatively high mechanical strength of extracted parts.

*Firing*

After removal from the previous stage (vacuum distillation, solvent extraction or the like), the parts still have a high green strength, though it is sometimes less than that of the cured parts, depending on the period of treatment.

The method of stacking the parts for the firing stage determines more than any other step the limits of dimensional accuracy. Sintered alumina above 1000° C. begins to show some ductility and at 1900° C. behaves like a perfect plastic body when under stress, a fact reported upon by E. Ryshkewitch in the Journal of the American Ceramic Society, vol. 34, No. 10, of 1951, at p. 235. An examination of commercial sintered alumina ware often shows that it has sagged due to plastic flow and insufficient support. It is important therefore in order to maintain dimensional tolerances to provide adequate support and allow for the fact that during the shrinking the parts will move relative to the support.

A good method of support is to embed the parts in fused granular alumina of a suitable grain size, but this method cannot be used where the part has holes or recesses, since it will shrink round the grains and crack itself.

Flat plates containing holes have been successfully fired by stacking them in a pile inside a saggar (a lidded container of refractory material), having previously dusted the surfaces with a very small quantity of zircon flour to minimise sticking. The zircon reacts with the alumina, forming a complex silicate having no known deleterious effects but allows the parts to be separated by gently tapping the edges with a hard object.

Some shapes may be stacked in the ordinary way inside a saggar, where the section of the part is thick enough to support its own weight, without distortion.

Small terminal insulators (about 1/8" overall) have been fired by simply heaping them in an alumina boat.

The furnace used is preferably a gas-fired batch kiln, the chamber being a vertical cylinder with an air-gas mixture entering tangentially at the bottom. Provision for an oxygen supply is a useful addition. Any other suitable furnace may, however, be used, but furnace atmosphere plays an important part in the results achieved.

The firing schedule for sintered alumina is fairly short. After an initial burning off period of about 1 hour at a temperature between 400° C. and 600° C. the temperature may be raised to 1200° C. in about 2 hours. From 1200° C. to the peak 1780°–1800° C., the rate of temperature rise should not exceed 200° C. per hour as all the shrinkage takes place in this range. The peak temperature is maintained for about ½ hour to 1 hour and the furnace may then be allowed to cool overnight, or may be force cooled in a few hours by cutting off the gas supply and reducing the air flow to a suitable value. Forced cooling, provided it is not too rapid, has no deleterious effect either on the ware or the furnace, provided the furnace refractories used have been carefully chosen. In one such furnace, the chamber was built from interlocking curved bricks made of sillimanite with a zircon inner facing, and this furnace gave good service.

The ceramic process, substantially as described above, has been applied to a number of other ceramic bodies in addition to pure alumina, and here it is desirable to explain further features of the process of more general application.

Firstly the particle size distribution of the ceramic body immediately prior to its admixture with the moulding vehicle will be considered. It is well known to those skilled in the art that the density, porosity, mechanical strength, surface smoothness and many other physical properties of the finally fired ceramic are strongly dependent on the initial particle size distribution of the ceramic body and that it is possible to control these properties within certain limits by suitable selection of the particle size distribution. Unfortunately, it is not always possible to select the distribution required to produce the desired results because the material becomes very difficult to fabricate by the traditional ceramic methods.

By the ceramic process described, however, the ease of fabrication into the desired shape becomes far less dependent upon the particle size distribution and upon the nature of the particles themselves. For example one does not have to rely on the natural plasticity of clays and similar materials to give the desired flow properties for fabrication. Again many of the solid state reactions may be brought to an advanced stage prior to fabrication of the shape, by calcination, thus eliminating a number of variable factors affecting the shrinkage of the moulding e.g. changes from one crystalline form to a denser crystalline form, and loss of combined moisture and carbon dioxide.

*Preparation of the ceramic body*

Some examples of types of ceramic body which have been treated by ceramic injection moulding by the ceramic process described are as follows:

(1) Pure alumina body.
(2) High alumina fluxed body.
(3) Soft porcelain body.
(4) Rutile body.
(5) Steatite body.
(6) Alkaline Earth body.
(7) Wollastonite body.

*Pure alumina body*

This, of course, is the subject of the specific embodiment extensively described above, but will now be discussed in more detail as a raw material in the ceramic process.

For this body it is preferable to start from very pure fine alumina, although the grain size selected will depend upon the application in view. For example, where non-porosity is not essential, a coarser starting material and a coarser milled material may be used; but for a highly dense material, as produced by the above process, finer starting material, e.g. that passing about 200 mesh per inch, is desirable, and a milling process that reduces to a particle size mainly less than 25 microns (1 micron=$10^{-6}$ metre=0.00004 inch).

The maximum particle size which will permit the production of non-absorbent and highly dense pure alumina ware varies somewhat according to the authorities studied. These authorities vary in their criteria of maximum particle size which can be tolerated, and the distribution of particle sizes below the maximum, as well as in the peak firing temperature. Figures range from a maximum diameter of 40 microns with the majority less than 10 microns and a firing temperature of 1850° C. to particles predominantly in the range 0.5 to 3 microns, and a firing temperature between 1700° C. and 1800° C. In the process herein described, the alumina used, wet milled 4 days (see Fig. 1), has 20% less than 3 microns (size-weight curve). However it is evident both from the literature and on theoretical grounds that increasing fineness reduces the sintering temperature necessary to produce the maximum density in the fired ware, though according to Ryschkewitch, mentioned above, it is doubtful whether this temperature can be brought below 1770° C. for pure alumina.

Ultra-fineness, however, is not to be pursued regardless of other considerations, since the resulting high specific surface area for a given concentration in the moulding vehicle may confer an unduly high viscosity on the latter, making it difficult to flow in the moulding operation. This was the case with the rutile body (q.v.).

Ultra-fineness may also result in an undesirable grain-texture in the fired body, a result reported on by Duvez, Odell and Taylor in J. Amer. Cer. Soc. 32 (1949).

Most of the work on pure sintered alumina reported in the literature has involved the use of steel mills and balls as the grinding media for reducing the particle size. This entails considerable contamination by iron. However since much of the processing is by means by slip-casting using hydrochloric acid slips, the contamination may be conveniently removed, prior to casting, by washing with hydrochloric acid and adjusting the pH.

For injection moulding of alumina, the latter is combined with organic materials and it is more convenient to use a milling procedure which avoids metallic contamination. This was achieved in the present invention by using a rubber ball-mill and sintered alumina balls as the grinding media. Both dry-milling and wet-milling were tried for various milling periods and some typical particle size-weight distributions obtained are shown in Figure 1. In these experiments all milling conditions were constant except of course for the milling time and the omission of water in the dry-milling. From the results it is evident that wet-milling has a distinct advantage over dry-milling in that a much larger proportion of fines is obtained over a shorter period. However, wet-milling for prolonged periods gives only a small increase in the weight percentage of fines and may be uneconomic on account of the time factor.

The density of about 3.5 g./cc. for pure alumina ware is not the optimum for the desirable physical properties of strength, non-porosity and surface smoothness, but is very well suited for some applications, e.g. valve electrode spacers where ease of degassing, high thermal shock resistance and high resistance to surface cracking are required. Pure alumina from which the majority of particles above 10 microns had been removed by sedimentation moulded normally and gave a product having a fired density of 3.74 g./cc. for a firing temperature of 1800° C., which is suitable for gas-tight, smooth and strong alumina ware.

The four-day wet-milling period previously referred to was selected as providing a suitable compromise among the various requirements of milling efficiency, mouldability and the sintering properties. A general all-round increase in efficiency, combined with some degree of control of the upper limit of particle size at any desired value, can be achieved by the use of a continuous-flow wet-milling plant in combination with settling tanks.

Alternatively, a separate sedimentation stage after the wet-milling may be introduced as a batch process, whereby an approximately 70% by weight theoretical yield of material less than 10 microns in particle size may be achieved.

High alumina fluxed body

The high alumina fluxed body uses the wet-milled alumina with the addition of a suitable ceramic flux. The following batch composition is given by way of Example 1:

| | Percent w.w. |
|---|---|
| Alumina (wet-milled 4 days) | 95 |
| Calcium oxide | 3 |
| Bentonite | 2 |

The batch is wet-mixed in a ball-mill, dried and pulverised between rubber rollers and mixed with any of the moulding vehicles described above for pure alumina.

This material moulds well and fires satisfactorily at 1650° C.

Such a body is suitable for many applications in the insulator field and has the advantage of a much lower firing cost.

Soft porcelain body

This type of body, consisting of a mixture of clay, kaolin, flint and feldspar, contains a good deal of colloidal matter and moisture in the initial mixed state and is calcined at 900° C. on that account and remilled before incorporating in the moulding mixture. Flint pebbles are used as the milling medium.

The material moulds well and fires satisfactorily at 1200° C.

Rutile body

Anatase was used as the starting material for this type of body, and this was calcined at 1000° C. to convert it to the rutile structure and increase the particle size and then remilled, using alumina balls or flint pebbles.

The material moulded very well and could be fired satisfactorily to a dense body.

Steatite body

This body is based primarily on a high quality talc with minor additions of fluxes. A typical formulation which was selected on the basis of a very low dielectric loss angle consisted of the following batch composition:

| | Parts by weight |
|---|---|
| Talc | 60 |
| Kaolin | 15 |
| Magnesium carbonate | 7.5 |
| Barium carbonate | 17.5 |

The components were mixed by wet-milling, using steatite balls, and calcined at 950° C. for 1½ hours. The calcined body was remilled before incorporation in the moulding mixture. This formulation illustrates particularly well how the flow properties and the shrinkage factor may be controlled by selection of the particle size distribution and the filter content. In this case it has been found that for a given flowability or mouldability, determined by means of a standard mould and moulding conditions, the filter content of the moulding compound and hence the shrinkage factor is a smooth function of the milling time of the calcined batch composition. That is for milling times within the range of 1 hour to 120 hours, the corresponding filter contents increase from about 62% by wt. to about 85% by wt. for equivalent mouldability. The shrinkage factors decrease correspondingly from about 25% to about 8%.

Alkaline earth body

This body is based on kaolin, flint and alkaline earths. A typical formulation which was selected on the basis of defined surface properties consisted of the following formulation:

| | Parts by weight |
|---|---|
| Kaolin | 71.0 |
| Flint | 13.0 |
| Calcium carbonate | 4.0 |
| Strontium carbonate | 4.0 |
| Magnesium carbonate | 4.0 |
| Barium carbonate | 4.0 |

The conditions of preparation depend very much on the nature of the ceramic surface required, which primarily is determined by the precalcination conditions. A precalcination temperature of about 1150° C. yields a ceramic surface eminently suitable for preparation of cracked carbon resistors. The filter content of the moulding compound is then derived as a function of milling time as in the previous example, and the milling time chosen to give the required shrinkage factor. Flint pebbles are used as the milling medium.

Wollastonite body

This body is based on the mineral calcium metasilicate and a suitable batch formulation is as follows:

| | Parts by wt. |
|---|---|
| Wollastonite | 70 |
| Kaolin | 20 |
| Barium carbonate | 10 |

This body may be processed in a manner similar to that for the two previous examples, the calcination conditions and milling conditions (using steatite balls) being chosen to suit the requirements of shrinkage factor and quality of the final ceramic. The conditions may be found by methods well known in the art.

Many other ceramic bodies may be processed by the method according to the invention and the examples described are merely illustrative of the general principles involved.

The moulding vehicle formulation

The main requirements of the moulding vehicle are as follows:

(1) Thermo-hardening with a sufficient thermoplastic life to maintain the initial mobility for a minimum period of about 1 hour;

(2) Sufficient mechanical strength combined with low creep to allow for removal of the part from the mould without distortion or breakage;

(3) Low viscosity in the softened state;

(4) Suitable distillation properties;

(5) Low adhesion to metal parts;

(6) Cheapness.

The thermoplastic life of 1 hour, as defined above, is necessary to allow for the mixing operation, which takes about three-quarters of an hour, and for the moulding operation, without deterioration of the flow properties.

There are two main types of thermosetting resin: those which polymerise under the action of heat alone and those which require the addition of a cross-linking agent and/or a catalyst, with or without the application of heat. Among the known thermosetting resins there are none which could satisfy all the above requirements simultaneously. Generally 1 and 2 can be met simultaneously but these are not compatible with 3, 4 and 5 for a number of reasons. Firstly the flow properties are very sensitive to changes in the degree of polymerisation in its early stages, secondly the resins are generally very sticky, and lastly, as a single phase they would have poor distillation properties, decomposition and distillation taking place over a narrow temperature range, resulting in disruption of the ware.

However, by diluting the thermosetting resin with a thermoplastic resin the concentration of polymerisable nuclei may be controlled and the flow properties made less sensitive to change in the degree of polymerisation in its early stages. In addition, by using a thermoplastic resin of lower softening range than that of the thermosetting resin, the working range of temperature for mixing and moulding may be increased and the distillation characteristics improved. The use of a thermosetting resin and a thermoplastic resin in combination therefore gives a fair degree of control over the properties of the moulding vehicle and a wide choice of the other components.

Requirements 3 and 5 are not met sufficiently well in practice without the use of a third type of component for the moulding vehicle which may be called a plasticiser. This consists of a wax or oil or mixture thereof, which acts as a blending agent for the two resins, reduces the viscosity by virtue of its low melting point, gives good release properties from metal surfaces, and improves the distillation characteristics.

The preferred basic formulation for the moulding vehicle may be summarised as follows:

(1) A thermosetting resin, with setting range $T_1$—$T_2$ and melting range $T_3$—$T_4$;

(2) A thermoplastic resin, with melting range $T_5$—$T_6$;

(3) A plasticiser with melting range $T_7$—$T_8$; where $T_1 > T_2 > T_3 > T_4 > T_5 > T_6 > T_7 > T_8$ and where $T_2$—$T_3$ is sufficiently large to give a thermoplastic life of about 1 hour at the concentration chosen.

It is the properties of the thermosetting resin which determine the selection of the other components, and the optimum properties of the moulding formulation are developed from this stage by a study of the relative mutual compatibilities of the components and by variation of the relative concentrations to produce the best compromise to suit the requirements listed above.

Referring to the preferred basic formulation above, the three basic components need not necessarily be represented only by a single member of their type. The thermosetting resin may, if desired, be replaced by a mixture of two or more thermosetting resin and the thermoplastic resin by a mixture of two or more thermoplastic resins, and similarly with the plasticiser. Also it is not necessary that the basic components be selected so as to be chemically inert with respect to each other. For example, the thermoplastic resin may be of a character such as to react as a cross-linking agent with the thermosetting resin. This is shown in moulding formulation (4), where the Bakelite resin acts as a cross-linking agent for the Epikote resin. Also the plasticiser may comprise a catalyst for the condensation of two resins, or the polymerisation of the thermosetting resin.

*Curing and low pressure distillation*

Ceramic injection moulding processes are known which use baking times (as distinct from firing times) varying from about 36 hours to 120 hours, but it is not known whether they use low pressure distillation, though it is unlikely.

The division of the baking out stage into a curing stage and a low pressure distillation stage in the process described results surprisingly in far less tendency to blistering and cracking of the moulding than does baking by the known process in spite of the increased rate of distillation at low pressure. In addition, the baking-out process is accomplished in a shorter time. It is believed that by heating the parts at 180°–200° C. for a period sufficient to cure the thermosetting resin and then re-heating the parts at low pressure slowly from about 140° C. to 200° C., sufficient extra stiffening of the parts by distillation takes place to prevent blistering.

Moreover, the provision of a low pressure distillation stage gives the important advantage that a wider range of thermosetting resins is made available since thermoplastic resins and plasticisers may then be used having very low vapour pressure (at normal temperatures). With such components, moulding and curing can be carried out without significant loss of plastic material, and in the low pressure distillation stage, removal of the low vapour pressure constituents can be effected at a relatively low temperature and consequently low vapour pressure, thus keeping the internal gaseous pressures at a low value and reducing the risk of distortion or fracture of the ware very materially.

The results obtained show that pure sintered alumina ware can be produced to a high degree of dimensional accuracy and in a very great variety of shapes by ceramic injection moulding by the process described. Dimensional accuracy has been as great as ±0.002″ per inch on some parts, and ±0.005″ per inch is quite common.

Ceramic injection moulding has the further advantage in that if desired a standard mould shrinkage can be used for various types of ceramic body by making use of two parameters: (a) the particle size distribution and (b) the inorganic content of the moulding compound. For example in the process described as applied to the production of sintered alumina ceramic, the volume percentage of alumina in the moulding formulation based on the density of 4 gm./cc. is approximately 60%, giving a shrinkage factor of approximately 13%. This figure is somewhat more than that using some traditional ceramic processes, but owing to the low viscosity of the moulding formulation at the moulding temperature, the uniformity of shrinkage is extremely high and easily controlled; and owing also to the non-volatile nature of the components of the moulding formulation at room temperature, the volume percentage of ceramic and hence the absolute shrinkage factor are more easily controlled. The low volume percentage and high shrinkage factor are in fact an advantage rather than a disadvantage since variation in particle size distribution for a given material or for different materials, and hence variation in the density of packing of the particles can be allowed for by increasing or decreasing the volume percentage, so as to yield a standard shrinkage factor, without increasing the viscosity of the moulding beyond the limit where flow is insufficient to give satisfactory mouldings. This feature enables very close control of dimensional accuracy in manufacture, and the choice of a variety of materials combined with low mould costs.

Mould wear in the cavity is practically negligible though carbide or ceramic gating should be used in production to maintain moulding conditions on long runs. This also makes for low mould costs and high dimensional accuracy.

While the principles of the invention have been described above in connection with specific embodiments, and particular modifications thereof, it is to be clearly understood that this description is made only by way of example and not as a limitation on the scope of the invention.

What I claim is:

1. A process for the production of articles from sinterable material which process comprises the steps of mixing the sinterable material with a vehicle the components of which comprise a thermosetting resin, a modifier for said resin, and a plasticiser, forming the mixed material and vehicle into the shape required by the application of heat and pressure without appreciable hardening of the thermosetting resin, stabilising the shape by hardening the thermosetting resin without appreciable loss of vehicle, removing the greater part of the vehicle, and finally firing the shape.

2. A process as claimed in claim 1 wherein the vehicle removing process is a vacuum distillation process.

3. A process as claimed in claim 1 wherein the vehicle removing process is a solvent extraction process.

4. A process as claimed in claim 1 wherein the components of the vehicle have a low vapour pressure under the conditions of stabilising the shape.

5. A process as claimed in claim 1 wherein the hardening of the thermosetting resin is carried out by heating with the application of an external pressure greater than atmosphere pressure.

6. A process as claimed in claim 1, wherein the hardening is effected by heating.

7. A process as claimed in claim 1, wherein the hardening is effected by means of an accelerator or catalyst.

8. A process as claimed in claim 1, wherein the modifier is at least partially compatible with the hardenable component in the presence of the plasticiser.

9. A process as claimed in claim 1, wherein the plastiser is a wax or oil or mixture of waxes and oils.

10. A process as claimed in claim 1 wherein the plasticiser has a low vapour pressure under the condition of hardening of the thermosetting resin.

11. A process as claimed in claim 1, wherein the vehicle has a thermoplastic life of at least 1 hour.

12. A process as claimed in claim 1, wherein the components of the vehicle are in the following temperature relationship:

$$T_1 > T_2 > T_3 > T_4 > T_5 > T_6 > T_7 > T_8$$

wherein $T_1$ to $T_2$ is the setting range of the thermosetting resin(s) and $T_3$ to $T_4$ their melting range; $T_5$ to $T_6$ is the melting range of the thermoplastic resin(s); and $T_7$ to $T_8$ is the melting range of the plasticiser(s); and wherein $T_2$ to $T_3$ is sufficiently large to give a thermoplastic (working) life for the compound of about 1 hour.

13. A process as claimed in claim 1 wherein the said thermoplastic resin reacts as a cross-linking agent with the said thermosetting resin.

14. A process as claimed in claim 1 wherein the ratio by volume of the sinterable material to the vehicle is in the range from 70/30 to 45/55.

15. A process as claimed in claim 1 wherein the sinterable material is calcined at a temperature below the final firing temperature and ground prior to mixing with the vehicle.

16. A process as claimed in claim 1 wherein the sinterable material comprises ceramic materials in finely divided state and having particles with diameters mainly in the range of 3 microns to 25 microns.

17. A process as claimed in claim 1, wherein the shape is formed by injection moulding.

18. A process as claimed in claim 1, wherein the shape is formed by extrusion.

19. A process as claimed in claim 1, wherein the shape is formed by hot compression or transfer moulding.

References Cited in the file of this patent

UNITED STATES PATENTS

| | | |
|---|---|---|
| 2,122,960 | Schwartzwalder | July 5, 1938 |
| 2,363,575 | DeLamatter et al. | Nov. 28, 1944 |
| 2,434,271 | Howatt | Jan. 13, 1948 |
| 2,446,872 | Ehlers | Aug. 10, 1948 |
| 2,580,708 | Wallace | Jan. 1, 1952 |